United States Patent [19]
Hays

[11] 3,750,481
[45] Aug. 7, 1973

[54] ACCELEROMETER
[75] Inventor: Eric L. Hays, West Allis, Wis.
[73] Assignee: AMU Company, West Allis, Wis.
[22] Filed: July 1, 1971
[21] Appl. No.: 158,738

[52] U.S. Cl. ............................................. 73/515
[51] Int. Cl. .......................................... G01p 15/02
[58] Field of Search ................... 73/514, 515, 430; 33/215 A, 346, 391

[56] References Cited
UNITED STATES PATENTS

| | | | |
|---|---|---|---|
| 1,368,941 | 2/1921 | Klein | 73/514 |
| 2,033,127 | 3/1936 | Dunlea | 33/215 A |
| 2,503,423 | 4/1950 | Silverman et al. | 33/215 A |
| 1,595,960 | 8/1926 | Brown | 33/215 A |
| 2,179,467 | 11/1939 | Cox | 33/346 |
| 2,569,311 | 9/1951 | Hoare et al. | 73/430 |
| 2,926,898 | 3/1960 | Taylor | 73/514 X |

FOREIGN PATENTS OR APPLICATIONS
1,212,751  3/1966  Germany ............................ 73/515

Primary Examiner—James J. Gill
Attorney—Wiviott & Hohenfeldt

[57] ABSTRACT

A balanced arm comprising an indicator wire and a counterweight is supported on a taut cord that serves as a rotational axis which is transverse to the direction in which acceleration is to be measured. The indicator wiere extends toward a scale which is visible from the front of the instrument. Linear acceleration of the vehicle on which the instrument is mounted causes the arm to turn and the indicator to assume a position relative to the scale corresponding with instantaneous relative acceleration. The instrument will also indicate inclination.

1 Claim, 3 Drawing Figures

PATENTED AUG 7 1973

3,750,481

INVENTOR
ERIC L. HAYS

BY *Wiviott & Hohenfeldt*

ATTORNEYS

ACCELEROMETER

BACKGROUND OF THE INVENTION

There has been a need for a simple, reliable and inexpensive instrument for indicating acceleration and deceleration of motor vehicles. Several such accelerometer instruments are on the market but their complicatedness and commensurate high cost and inaccuracy have discouraged their widespread use. On the other hand, there is an increased need for an instrument which will indicate acceleration and deceleration in order to evaluate engine performance, braking ability, and centrifugal forces while turning for example. Accelerometers are also needed for comparing the performance of a vehicle with its previous performance and with that of other vehicles.

SUMMARY OF THE INVENTION

An object of the present invention is to provide an accelerometer which is simple, inexpensive and reliable by virtue of it having few relatively movable parts.

A further object of the invention is to provide an accelerometer that will indicate the inclination of the vehicle or other object to which it is attached.

Another object is to incorporate in an accelerometer a simple means for damping harmonic oscillations and vibrations.

How the foregoing and other more specific objects are achieved will appear from time to time in the more detailed description of an embodiment of the invention which will be set forth hereafter.

In general terms the new accelerometer comprises a housing having a glass front face behind which there is a scale. The mechanism comprises a cylinder which is supported on a taut cord or wire whose axis is transverse to the direction in which acceleration is to be measured. The cylinder has fastened to it an arm comprising a counterweight arm and an opposed indicator arm. Linear acceleration causes development of a rotational force moment by the arms which is proportional to the instantaneous linear acceleration.

A more detailed description of the invention will now be set forth in reference to the drawing.

DESCRIPTION OF A PREFERRED EMBODIMENT

Figure 1:
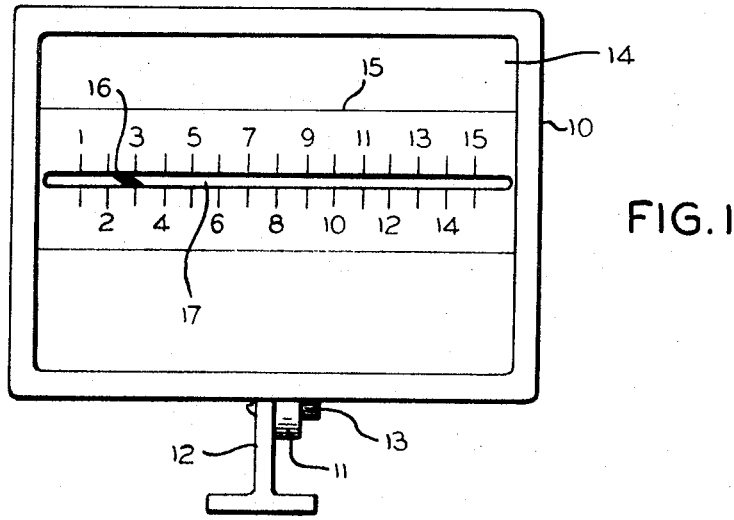
FIG. 1 is a front view of the new accelerometer.

Referring to FIG. 1, there is a housing 10 shown which has a base extension 11 attached to a mounting foot 12 by means of a bolt 13. The face of housing 10 is occupied by a transparent window 14 which may be glass or plastic. Behind the face within the instrument is a linear numerical scale 15. The indicator 16 or pointer of the instrument is shown diagonally disposed in this example as it would be if the instrument were experiencing three units of acceleration. Of course, when the velocity of the vehicle on which the instrument is mounted is uniform, positive and negative acceleration will be zero and the indicator 16 will be at zero if the instrument is so calibrated.

Figure 2:
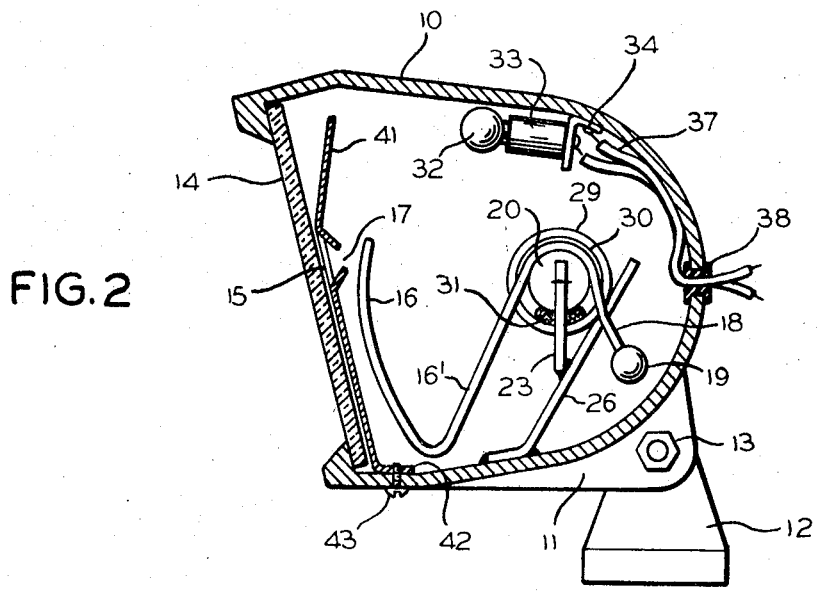
FIG. 2 is a side elevation view of the interior of the accelerometer, showing the housing in section.
Figure 3:
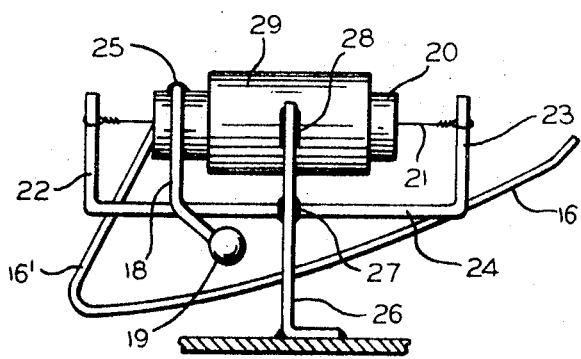
FIG. 3 is a rear view of the internal operative parts of the device with the housing removed.

Refer now to FIGS. 2 and 3 in which the operating components of the instrument are shown primarily schematically for the sake of facilitating explanation. The assembly comprises a pivotable element or arm assembly which has one arm 16 serving as an indicator and another arm 18 serving as a counterweight along with added mass or weight 19. Arm 16 comprises two sections one of which is marked 16' and is continuous and bent angularly with respect to the other. The indicator arm 16 and counterweight 18, 19 are mounted on a cylinder 20 which serves as an arbor to which the arms are attached. Cylinder 20 is attached to and supported by a taut cord means suspension 21. In practice a nylon thread has been used for a suspension cord. Opposite ends of the cord 21, besides being fastened to cylinder 20, are fastened to upstanding resilient legs 22 and 23 of a yoke 24. Legs 22 and 23 are prestressed when cord 21 is attached and tend to spring outwardly to maintain tension in the cord. The cord is thus capable of twisting and acting as a pivot axis and as a support for cylinder 20 and the balanced arm assembly which it carries. The arm assembly, comprising arms 16 and 18, may be affixed to cylinder 20 by means of epoxy resin 25 or any suitable mechanical fastening means.

Yoke 24 and its affiliated upstanding resilient legs 22 and 23 are supported on an inclined column 26 by means of epoxy resin 27, for example. Supported at the upper end of column 26 by any suitable means such as epoxy resin in the vicinity of numeral 28, there is a hollow outer cylinder 29 which surrounds inner rotatable cylinder 20 concentrically. As can be seen in FIG. 2, there is a small annular gap 30 between outside cylinder 29 and inner cylinder 20. A segment of this gap or the entire interface between the inner and outer curved surfaces of the cylinders is occupied by a viscous fluid 31 which is subjected to shear forces and thus dampens harmonic swinging and vibration of the arm assembly. The entire gap 30 may be filled circumferentially with viscous fluid in some designs. End seals are not needed because the viscous fluid does not flow out. Silicone fluids may be used as a viscous substance since they have a flat viscosity index over a relatively wide temperature range. Those skilled in the art will appreciate that elements could be reversed; that is, the outer cylinder 29 could support arm 16 and be journalled or otherwise mounted for rotation and the inner cylinder 20 could be fixed relative thereto.

An electric lamp 32 is used to establish a fairly constant temperature within housing 10 within reasonable ambient temperature limits. Lamp 32 also illuminates the scale 15. The lamp socket 33 is mounted in the top of housing 10 on a grounded bracket 34. The live and ground wires 36 and 37 extend unitarily as a cable through an insulating grommet 38 in the back of housing 10.

As can be seen in FIGS. 2 and 3, the balanced indicator arm comprises two sections which are marked 16 and 16', respectively. Section 16' normally extends generally downwardly and sideways and by means of a bend forms a more horizontal bit somewhat inclined section 16 which serves as an indicator needle. Behind transparent front 14 and within housing 10 is a mask plate 41. The central region of the masking plate has a slot 17 and the indicator needle 16 is disposed immediately behind this slot. Due to the curvature of section 16 of the indicator needle, it remains in close proximity with slot 17 regardless of the rotational angle of the arm assembly. As indicated earlier, indicator needle 16 is visible from the front of the instrument through slot 17 so as to permit comparing the position of the indicator with scale 15. Scale 15 may be self-adhering transparency adhered as shown on the inside face of transparent front 14 so that the scale will be illuminated by light from lamp 32 passing through slot 17 and indicator needle 16 will be visible in the dark. Scale 15 may also be mounted in a suitable opening in the masking plate. This accelerometer may be zeroed or calibrated by merely bending indicator arm or needle 16. The instrument may also be calibrated by tilting it on mounting foot 12. The scale 15 may have a zero mark at its left end or, alternatively, at its center. In the latter case the instrument will indicate acceleration in forward or reverse directions if the needle is appropriately calibrated initially.

Operation of the device is as follows: The center of mass of the indicator arm sections 16 and 16' and the center of mass of the counter-weight arm 18 and its addition weight 19 are both below a horizontal plane through the pivot axis of the arm assembly when the object on which the instrument is mounted is not accelerating so there is no net rotational force since the arms are balanced. In other words, the center of mass of the inner cylinder and arm assembly is on the balancing axis or the cord. When the object on which the instrument is mounted is accelerated in a direction which has a vectorial component that is normal to the pivot or cord axis, inertia dictates that the masses of the balanced arms will tend to remain at rest. But the axis rotation translates and produces a force which is counteracted by the mass of the arms and causes them to rotate. The rotational moments of both arms are in the same direction.

Thus, if as viewed in FIG. 2, the instrument is accelerated to the right, the arms will turn clockwise about the pivot axis and angularly disposed indicator arm 16 will rise and transverse along scale 15 a distance that corresponds with the rate of change of velocity or acceleration. When a constant velocity is reached, the needle returns to zero if the vehicle is not inclined. During acceleration, suspension cord 21 is twisted but it sets up little restoring torque. It is the weight of the arms which returns the arm assembly to zero when the accelerating interval is terminated.

As suggested earlier, the device can also be adapted for indicating deceleration or negative acceleration as well as positive acceleration. This adaptation can be achieved by establishing the zero point at the center of scale 15 or bending needle 16 appropriately so that it is crossing the center or zero point when the instrument is at rest and level. The needle 16 may also be made to slant in a direction opposite the way it is shown for indicating deceleration. Under such circumstances, the needle will swing in one direction when the instrument and the vehicle on which it is supported move forward under acceleration and the needle will move in the opposite direction during deceleration from the zero position which the needle attained after the vehicle had reached constant velocity. In any event, the embodiment of the invention described above will indicate acceleration in the direction of a line which is perpendicular to the suspension axis of the arm assembly. Thus, centrifugal forces incidental to turning the vehicle may be indicated by directing the instrument laterally of the vehicle rather than forwardly or rearwardly.

Although the structural elements of the new accelerometer have been described in considerable detail, such description is to be considered illustrative rather than limiting, for the invention may be variously embodied and is to be limited only by interpretation of the claims which follow.

I claim:
1. An accelerometer comprising:
    a. a housing,
    b. a taut cord means extending in said housing in substantial perpendicularity with the direction in which acceleration is to be measured,
    c. an inner cylindrical element having its axis substantially coincident with said cord means and fastened thereto, rotation of said cylindrical element twisting said cord means,
    d. an elongated element fastened intermediate its ends to said inner cylindrical element with a part of said elongated element extending generally radially in one direction and another part extending generally radially in an opposite direction from the axis of said inner cylindrical element, the said one part serving as an indicating means and the other part as a balancing counterweight means,
    e. a fixedly mounted hollow outer cylindrical means concentric with said inner cylindrical element and defining an annular gap therebetween,
    f. a viscous substance in said gap, and
    g. a graduated scale fixedly mounted in proximity with the path traversed by said one part of said elongated element when it undergoes rotation due to acceleration.

* * * * *